United States Patent
Park et al.

(10) Patent No.: US 10,274,334 B2
(45) Date of Patent: Apr. 30, 2019

(54) ROUTE GUIDANCE METHOD, NAVIGATION TERMINAL AND VEHICLE INCLUDING THE SAME

(71) Applicant: HYUNDAI MOTOR COMPANY, Seoul (KR)

(72) Inventors: Un Kyu Park, Seoul (KR); Nam Joon Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/960,200

(22) Filed: Dec. 4, 2015

(65) Prior Publication Data
US 2017/0097244 A1    Apr. 6, 2017

(30) Foreign Application Priority Data
Oct. 6, 2015  (KR) .................... 10-2015-0140258

(51) Int. Cl.
*G01C 21/36*    (2006.01)
*G06N 99/00*    (2010.01)

(52) U.S. Cl.
CPC ..... *G01C 21/3629* (2013.01); *G01C 21/3673* (2013.01); *G06N 99/005* (2013.01); *G01C 21/3644* (2013.01); *G01C 21/3664* (2013.01)

(58) Field of Classification Search
CPC .......... G01C 21/3629; G01C 21/3664; G01C 21/3673; G01C 21/36; G01C 21/3446; G01C 21/3661; G01C 21/3667; G01C 21/36; G06N 99/005
See application file for complete search history.

(56) References Cited

U.S. PATENT DOCUMENTS

| | | | |
|---|---|---|---|
| 9,273,979 B2* | 3/2016 | Su ...................... | G01C 21/3632 |
| 2002/0128774 A1* | 9/2002 | Takezaki .................. | B60Q 9/00 |
| | | | 701/431 |
| 2008/0221792 A1 | 9/2008 | Nakayama | |

(Continued)

FOREIGN PATENT DOCUMENTS

| | | |
|---|---|---|
| JP | H09-113303 A | 5/1997 |
| JP | H09126803 A | 5/1997 |
| JP | H09196695 A | 7/1997 |

(Continued)

OTHER PUBLICATIONS

Office Action issued in corresponding Korean Patent Application No. 10-2015-0140258, dated Sep. 19, 2016.

(Continued)

*Primary Examiner* — Jerrah Edwards
*Assistant Examiner* — Mathew Franklin Gordon
(74) *Attorney, Agent, or Firm* — Morgan Lewis & Bockius LLP

(57) ABSTRACT

A route guidance method for executing voice route guidance for a route to a destination set by a user includes: executing a first voice route guidance at an interval according to a current guidance level; receiving a suppress command or a request command of the user during the execution of the first voice route guidance; determining a new guidance level on the basis of count results for the suppress command and the request command; and executing a second voice route guidance at an interval according to the new guidance level.

8 Claims, 5 Drawing Sheets

(56) References Cited

U.S. PATENT DOCUMENTS

| | | | | |
|---|---|---|---|---|
| 2010/0268453 | A1* | 10/2010 | Otani | ............ G01C 21/3629 |
| | | | | 701/533 |
| 2016/0076903 | A1* | 3/2016 | Diaz | ............ G01C 21/3484 |
| | | | | 701/468 |

FOREIGN PATENT DOCUMENTS

| | | |
|---|---|---|
| JP | H10-288532 A | 10/1998 |
| JP | 2001-280990 A | 10/2001 |
| JP | 2001-304900 A | 10/2001 |
| JP | 2001-324990 A | 11/2001 |
| JP | 2003-156348 A | 5/2003 |
| JP | 3804746 B2 | 8/2006 |
| JP | 2011-163778 A | 8/2011 |
| JP | 2012-215476 A | 11/2012 |
| JP | 2013-096865 A | 5/2013 |
| KR | 10-2010-0029447 A | 3/2010 |

OTHER PUBLICATIONS

Korean Notice of Allowance issued in corresponding Korean Patent Application No. 10-2015-0140258, dated May 30, 2015, with partial English translation.

\* cited by examiner

ROUTE GUIDANCE METHOD, NAVIGATION TERMINAL AND VEHICLE INCLUDING THE SAME

CROSS-REFERENCE TO RELATED APPLICATION

This application claims the benefit of priority to Korean Patent Application No. 10-2015-0140258, filed on Oct. 6, 2015, which is hereby incorporated by reference as if fully set forth herein.

TECHNICAL FIELD

The present disclosure relates to a route guidance method, a navigation terminal, and a vehicle including the same, and more specifically, to a route guidance method capable of adjusting the frequency of voice route guidance according to user convenience, a navigation terminal, and a vehicle including the same.

BACKGROUND

A navigation system is a system for providing information for traveling of vehicles using satellites and is also called an autonomous navigation system.

The navigation system receives predetermined data from global positioning system (GPS) satellites using a GPS receiver and calculates a position thereof on the basis of the received data.

The navigation system can provide information that aids in driving, such as informing a user of the current location of a vehicle on the basis of the position information thereof, routing a route to a desired destination, and guiding the user on the route.

The navigation system stores geometry data about maps and point-of-interest (POI) information indicating buildings, roads, and the like on the maps and uses the stored geometry information and the POI information as information for route guidance.

That is, the navigation system receives signals including latitude and longitude information from GPS satellites, calculates the location of a user, outputs the calculated location, and provides a route to a desired destination of the user while map-matching POI information to geometry information arranged according to latitude and longitude.

With a recent increase in the number of vehicles, the number of intersections having a plurality of access roads increases since roads have become widened or additional roads are built. When such an intersection is present on a route, the navigation system indicates information about an exit direction and an entry direction of the intersection as an image on geometry information and provides voice guidance about the entry direction on the basis of a distance.

However, conventional voice route guidance is performed at a predetermined interval or predetermined frequency irrespective of user requirements. Accordingly, some users recognize that route guidance is excessively frequently executed which may disturb safe driving, while other users recognize that route guidance is too infrequently executed and thus they may miss necessary guidance.

SUMMARY

An aspect of the present inventive concept provides a route guidance method, a navigation terminal, and a vehicle including the same, which can perform voice route guidance at a frequency tailored to a user by reflecting requirements of the user in the frequency of voice route guidance.

The technical problems solved by the present disclosure are not limited to the above technical problems and those skilled in the art may understand other technical problems from the following description.

According to an embodiment in the present disclosure, a route guidance method for executing voice route guidance for a route to a destination set by a user includes: executing a first voice route guidance at an interval according to a current guidance level; receiving a suppress command or a request command of the user during the execution of the first voice route guidance; determining a new guidance level on the basis of count results for the suppress command and the request command; and executing a second voice route guidance at an interval according to the new guidance level.

According to the aforementioned route guidance method, navigation terminal, and vehicle including the same, when the user does not hear voice guidance of the navigation system while driving the vehicle and thus the user re-requests voice guidance, the corresponding voice route guidance can be immediately performed so as to aid in safe driving.

In addition, when the user requests voice guidance of the navigation system to be stopped since the voice guidance is unnecessarily repeated, disturbing conversation, music listening, and the like, the corresponding voice route guidance can be immediately stopped to promote user convenience.

Furthermore, a plurality of guidance levels for the frequency of voice route guidance is provided such that the user can select an appropriate guidance level according to user requirements, improving user experience.

Moreover, user satisfaction for voice guidance can be improved by automatically selecting a guidance level on the basis of the number of re-requests of the user and the number of requests for stopping voice route guidance without user intervention.

The effects of the present disclosure are not limited to the above-described effects and other effects which are not described herein will become apparent to those skilled in the art from the following description.

DETAILED DESCRIPTION

Reference will now be made in detail to the exemplary embodiments, examples of which are illustrated in the accompanying drawings. Although the suffix "module" or "unit" is used for constituent elements described in the following description, this is intended only for easy description of the specification.

A description will be given of a route guidance method, a navigation terminal and a vehicle including the same according to an embodiment in the present disclosure with reference to the attached drawings.

Figure 1:
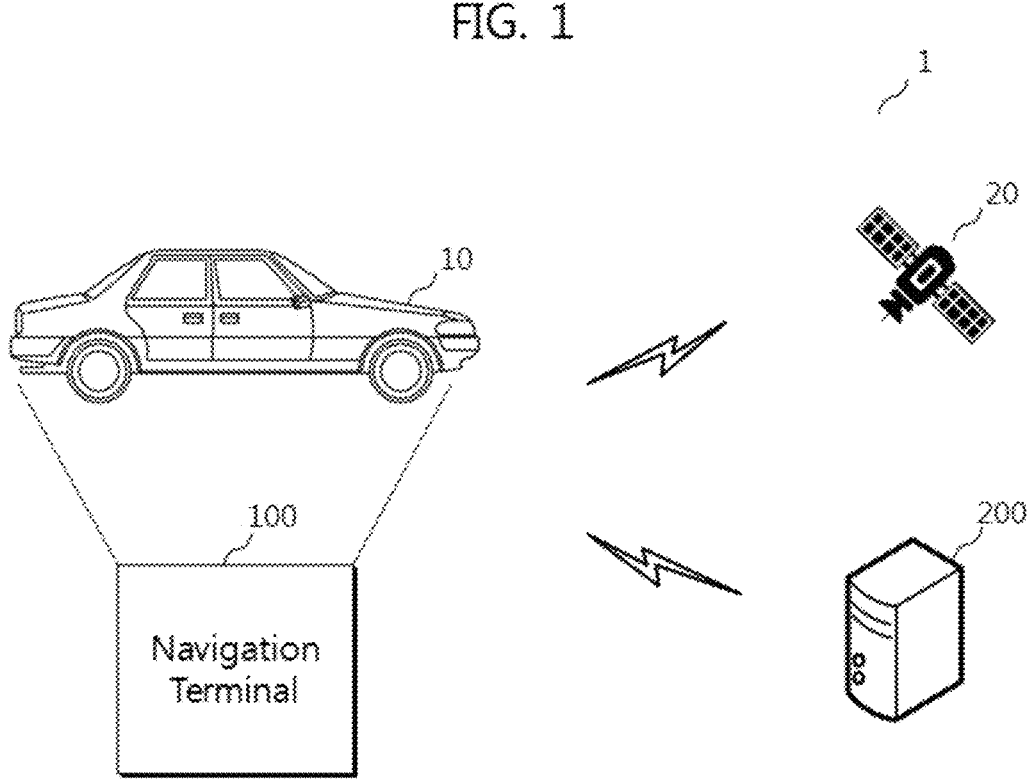
FIG. 1 is a block diagram of a navigation system according to an embodiment in the present disclosure.

FIG. 1 is a block diagram of a navigation system according to an embodiment in the present disclosure.

Referring to FIG. 1, the navigation system 1 may include a vehicle 10, a global positioning system (GPS) satellite 20, a navigation server 200, and a navigation terminal 100.

The vehicle 10 includes the navigation terminal 100 through which a navigation service can be provided. The navigation service aids in driving the vehicle 10 by monitoring the location of the navigation terminal 100 in real time, indicating the location of the navigation terminal 100 on a map and showing a route to a destination designated by a user.

Since the vehicle 10 includes the navigation terminal 100, the location of the navigation terminal 100 may be the location of the vehicle 10.

A head unit of the vehicle 10 performs control operations such as air-conditioning and management of the vehicle 100 and can transmit/receive control or data signals by being electrically connected to the navigation terminal 100.

The GPS satellite 20 is located above the earth and can provide a navigation message to the navigation terminal 100. While FIG. 1 shows one GPS satellite 20, more than three GPS satellites may be located above the earth.

The navigation server 200 provides the navigation service and may be implemented as a telematics center. The navigation server 200 can provide a telematics service. The telematics service provides a navigation function, various multimedia functions such as burglar alarm, emergency rescue (SOS), remote diagnosis, supplies administration, hands-free mobile phone, living information, personal information, secretary service and Internet access, an interactive Internet function and a mobile service, using a telematics terminal.

The navigation server 200 may manage opening of the service of the terminal provided to the vehicle 10, collect information that the user requires, transmit the collected information to the terminal set in the vehicle 10 or transmit information received from the terminal to a network operator server or a corresponding organization (e.g. an insurance company or an emergency rescue center).

The navigation server 200 may operate, inside or outside of the center, a database for storing and managing information about the vehicle 10, information about the navigation terminal 100, map data, firmware upgrade information of the navigation terminal 100 and the like.

The navigation terminal 100 may be implemented as a telematics terminal. However, the present disclosure is not limited thereto.

A navigation service application may be installed in the navigation terminal 100 and executed when the vehicle 10 starts to automatically start the navigation terminal 100.

Figure 2:
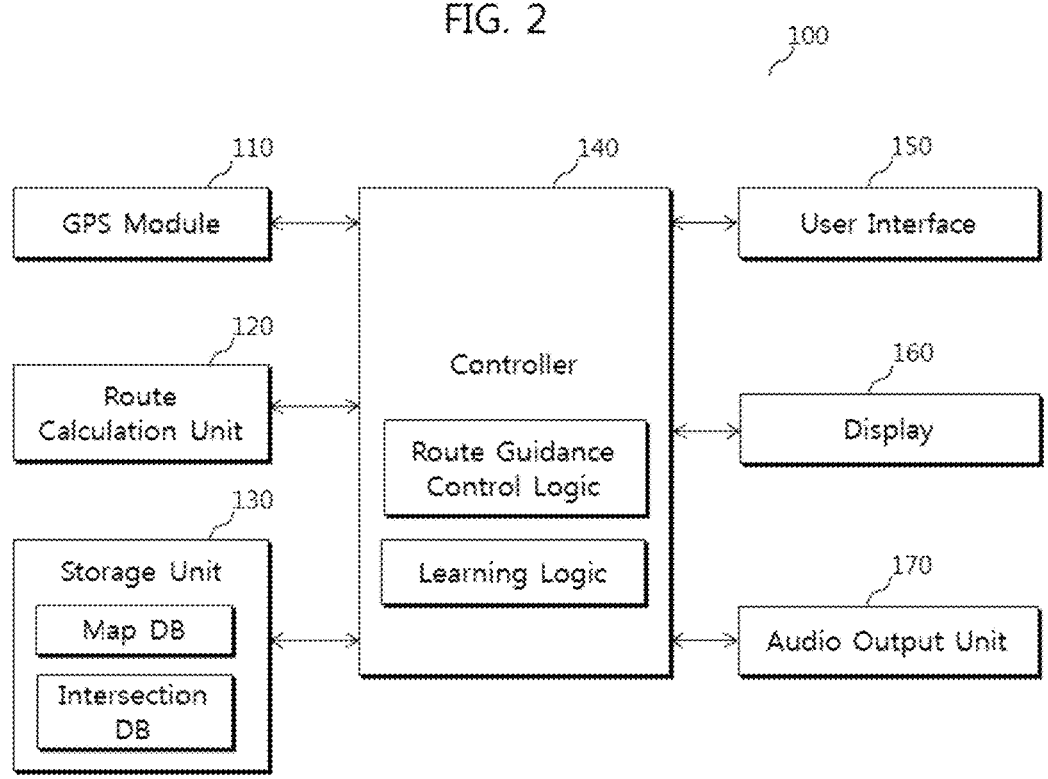
FIG. 2 is a block diagram of a navigation terminal shown in FIG. 1.

FIG. 2 is a block diagram of the navigation terminal shown in FIG. 1.

Referring to FIG. 2, the navigation terminal 100 includes a GPS module 110, a route calculator 120, a storage 130, a controller 140, a user interface 150, a display 160, and an audio output 170.

The GPS module 110 may receive a navigation message from the GPS satellite 20 and calculate the location thereof.

The storage 130 includes a map data storing map data about a national map and route guidance data related to the map data. The storage 130 stores a control program for controlling the overall operation of the navigation terminal 100, including a route guidance function and an intersection turn guidance function during route guidance.

The intersection turn guidance guides a turn direction at an intersection using a point of interest (POI) around the intersection. To achieve this, it is necessary to construct a database (referred to as an intersection database hereinafter) of representative POI information about intersections. The intersection database may be constructed by designating a POI present at a position which is easily recognized by a user, from among a plurality of POIs around the intersection, as a representative POI according to a turn direction at the intersection.

The intersection database stores intersections included in the national map, turn directions at each intersection, and a representative POI according to each turn direction per intersection and is included in the storage 130.

Turn directions at each intersection correspond to routes through each intersection, through which vehicles can be turned according to traffic laws, and include at least one of a left turn, a right turn, a U-turn, a P-turn and a rotary turn. A representative POI is designated according to each traveling course available per intersection and input to the intersection database, and regulated turning courses are not input to the intersection database.

The route calculator 120 detects the current location of the user using a GPS signal received through the GPS module 110 and traces a route from the current location to a destination designated by the user from map data stored in the map database of the storage 130 so as to generate route information.

The controller 140 performs route guidance according to the route on the basis of the route information generated by the route calculator 120. In addition, the controller 140 performs turn guidance at an intersection on the basis of the information stored in the intersection database of the storage 130 when the vehicle approaches the intersection on the route.

A route guidance control logic included in the controller 140 manages a guidance level. An interval at which specific voice route guidance (e.g. voice guidance executed per specific distance when approaching an intersection) is output through the audio output 170 can be determined according to the guidance level. Here, the interval may be an interval with respect to distance. However, the scope of the present disclosure is not limited thereto. Furthermore, the interval may not refer to an interval according to specific distance (for example, voice route guidance is performed at intervals of 500 m, 200 m, 100 m, and 50 m rather than per 100 m).

For example, when an intersection is 1 km ahead of the current location, voice guidance can be output per 100 m, that is, at 1 km, 900 m, 800 m, . . . , and 100 m if the guidance level is high, whereas voice guidance can be output with a lower frequency, for example at 1 km, 500 m and 100 m when the guidance level is low.

A learning logic included in the controller 140 may count the number of inputs of a specific command (SUPPRESS or REQUEST) of the user through the user interface 150 and determine the guidance level through a learning algorithm on the basis of the number of inputs accumulated for a predetermined period. The learning algorithm will be described later with reference to FIGS. 4 to 6.

The user interface 150 is an input means through which a user command with respect to the navigation system, such as a destination for the route guidance function, is input and may be a touch pad integrated with the display 160 so as to provide a graphical user interface. A user command is input in such a manner that all menu environments related to the route guidance function of the navigation terminal 100 are provided as a screen through the display 160 such that the user touches a specific point on the screen using a stylus or a finger.

In addition, the user interface 150 may include a means through which user commands can be input, such as a button of a steering wheel, a voice recognition module, a gesture recognition module and the like.

The display 160 displays information about the overall operation of the system and map information for route guidance and may be a liquid crystal display (LCD), an organic electroluminescent (EL) display, or the like.

The audio output 170 performs voice guidance when the route guidance function is executed for a route and may provide voice guidance during guidance of a turn at an intersection.

Figure 3:
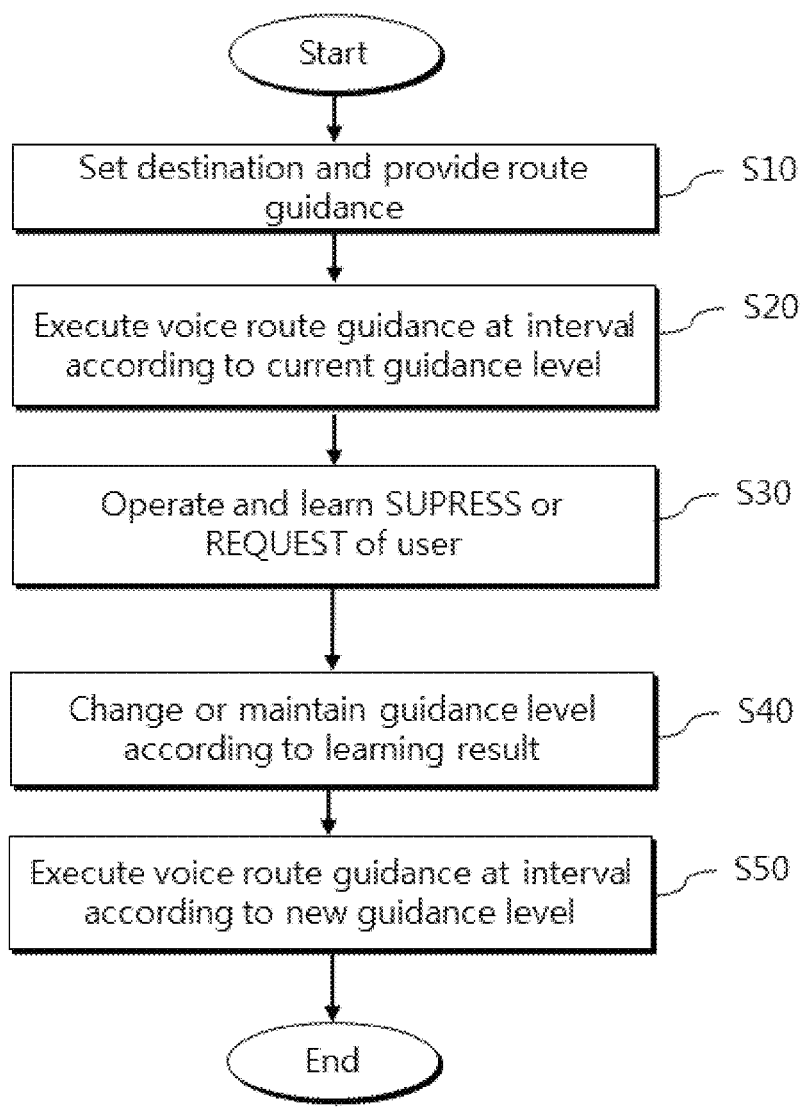
FIG. 3 is a flowchart illustrating a route guidance method according to an embodiment in the present disclosure.
Figure 4:
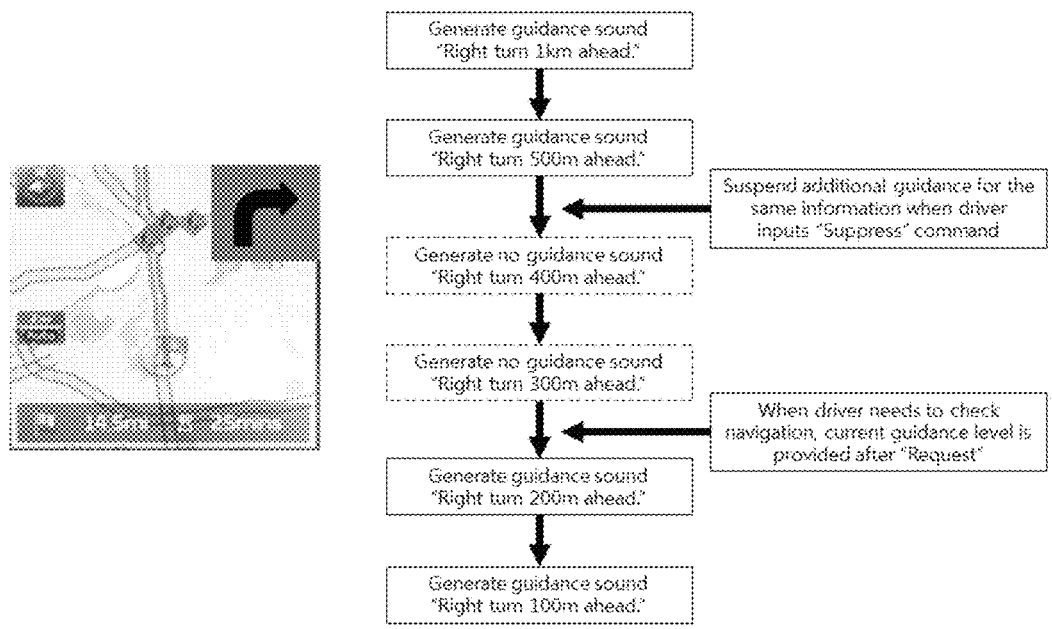
FIG. 4 is a view for explaining step S30 shown in FIG. 3.
Figure 5:
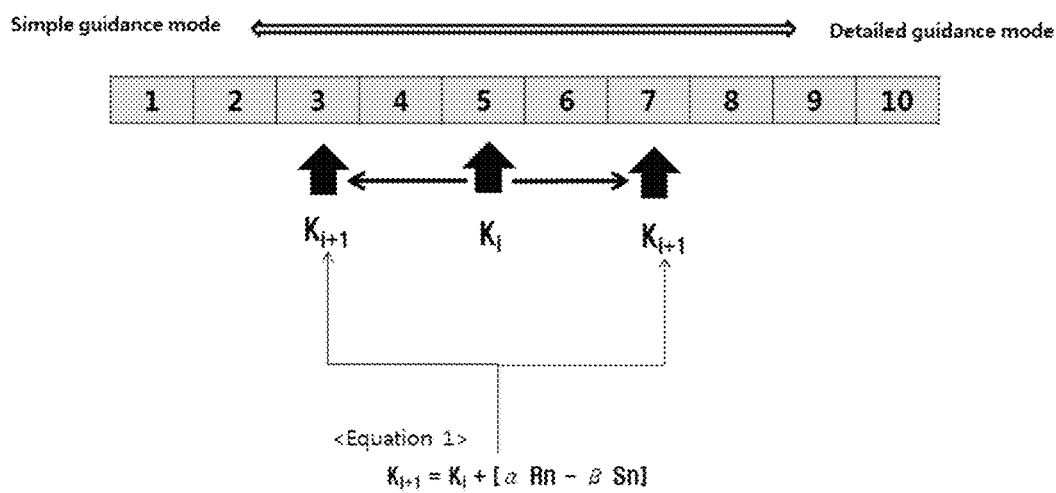
FIGS. 5 and 6 are views for explaining step S40 shown in FIG. 3.
Figure 6:
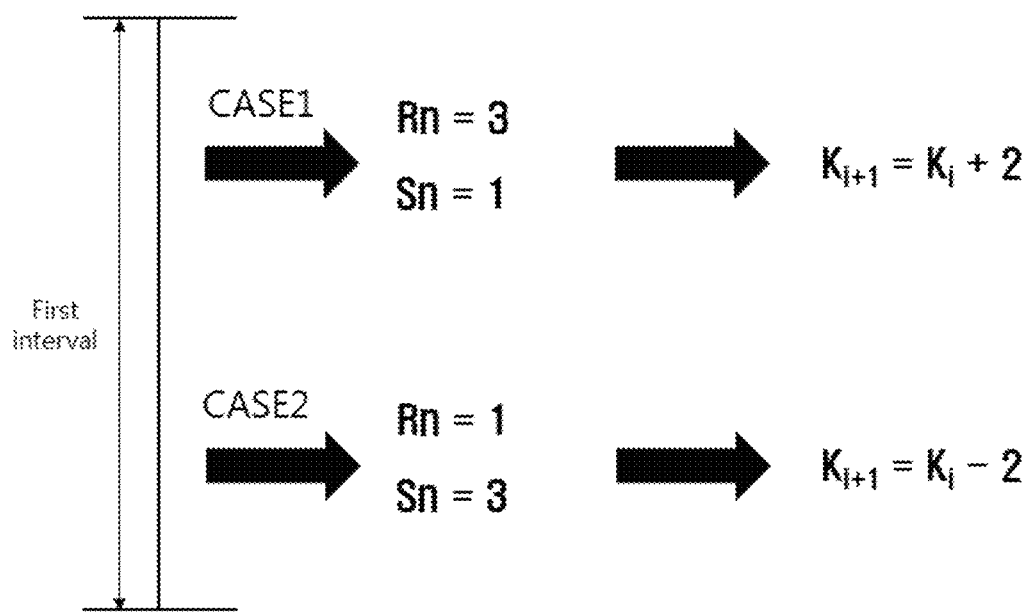

FIG. 3 is a flowchart illustrating a route guidance method according to an embodiment of the present invention, FIG. 4 is a view for explaining step S30 shown in FIG. 3 and FIGS. 5 and 6 are views for explaining step S40 shown in FIG. 3.

Referring to FIGS. 1 to 6, a user executes a user menu for setting a destination on the navigation program of the navigation terminal 100 and sets a destination for the route guidance function through the user menu in FIG. 3. When the user requests the route guidance service for the set destination, the current location of the user is calculated from a location signal received through the GPS module 10 and a route from the calculated current location to the set destination is traced. Subsequently, a map screen and voice guidance for the route are generated such that the user drives the vehicle along the route to provide route guidance service (S10).

Here, voice guidance can be performed at specific intervals when important guidance information that the user needs to know is present in addition to guidance provided to the user through the display 160. For example, voice guidance can be performed when a direction change (left turn, right turn, U-turn and the like) at an intersection is needed, a speed bump is present ahead of the vehicle, and the vehicle enters a school zone. In the specification, voice guidance performed when a direction change at an intersection is needed is exemplified.

The route guidance control logic included in the controller 140 manages the current guidance level and may execute voice route guidance at an interval according to the current guidance level (S20). Here, the frequency of voice route guidance is proportional to the interval.

In FIG. 4, it is assumed that the vehicle needs to turn right soon at an intersection as shown on the screen of the display 160 illustrated at the left of the figure. In addition, it is assumed that the route guidance control logic executes voice route guidance when a distance to the intersection is 1 km, 500 m, 400 m, 300 m, 200 m, and 100 m according to the current guidance level.

When voice route guidance is excessively frequently executed, the user can input a SUPPRESS command (or STOP command) through the user interface 150 in order to stop voice route guidance. The SUPPRESS command is a command for stopping currently executed voice route guidance, and the route guidance control logic can stop repetitive voice route guidance according to the SUPPRESS command. However, such suspension of voice route guidance does not stop all future voice route guidance and voice route guidance (e.g. guidance of a left turn at the next intersection) after passing the intersection can be re-performed according to the current guidance level.

When the user does not want to hear guidance of the corresponding intersection any more after voice route guidance of "right turn 500 m ahead" is executed (for example, when voice route guidance disturbs music listening or conversation) in FIG. 4, the SUPPRESS command can be input through the user interface 150 and additional guidance of the same information can be stopped. That is, subsequent voice route guidance of "right turn 400 m ahead" and "right turn 300 m ahead" is omitted.

When the user wants to hear voice route guidance in a state that voice route guidance is suspended, the user can input a REQUEST command (or re-request command) through the user interface 150 in order to re-execute voice route guidance. The REQUEST command is a command for re-executing suspended voice route guidance, and the route guidance control logic can re-execute voice route guidance of the same information according to the REQUEST command.

When the user wants to hear the guidance of the corresponding intersection after voice route guidance is suspended (for example, when the user needs to check navigation guidance since the user misses or cannot remember the last guidance), the REQUEST command can be input through the user interface 150 and voice route guidance of the same information according to the current guidance level can be re-executed. That is, subsequent voice route guidance of "right turn 200 m ahead" and "right turn 100 m ahead" is executed.

According to an embodiment, upon input of the REQUEST command, a distance to the intersection may be calculated on the basis of the current location of the vehicle 10, independently of voice route guidance according to the current guidance level, and voice route guidance may be executed on the basis of the distance. For example, when the REQUEST command is input at a point at a distance of 300 m from the intersection and the calculated distance to the intersection is 255 m, voice route guidance of "right turn 255 m ahead" can be executed. This function can be effective when the user wants to urgently hear voice guidance after predetermined voice route guidance is ended.

Here, the SUPPRESS command and the REQUEST command may be input through a button of a steering wheel, a voice recognition module and a gesture recognition module of the user interface 150, a touch pad integrated with the display 160 and the like.

Whenever the SUPPRESS command and the REQUEST command are input, the learning logic included in the controller 140 can count the SUPPRESS command and the REQUEST command for a predetermined interval and respectively store count results as SUPPRESS NOTIFICATION(Sn) and REQUEST NOTIFICATION(Rn). The learning logic can generate a learning result (the result of Equation 1 of FIG. 5) on the basis of Sn and Rn (S30).

The route guidance control logic can change or maintain the guidance level according to the learning result (S40).

In FIG. 5, it is assumed that the guidance level managed by the route guidance control logic includes levels 1 to 10. However, the scope of the present disclosure is not limited thereto.

Level 1 corresponds to a simple guidance mode and level 10 corresponds to a detailed guidance level. That is, level 1 may be a mode generating guidance sound least frequently (for example, "right turn 1 km ahead" is generated once) and level 10 may be a mode generating guidance sound most frequently (for example, guidance sound is generated every 50 m from 1 km ahead), for the same voice route guidance.

While a minimum value of the current guidance level $K_i$ may be manually selected by the user, a default value (e.g. level 5) can be set.

The current guidance level $K_i$ can be changed to a new guidance level ($K_i+1$) at a predetermined guidance level change interval (e.g. one hour, two hours, one day, or whenever rebooting is performed). Here, the new guidance level Ki+1 may be different from or identical to the current guidance level Ki.

The new guidance level Ki+1 can be calculated by the learning logic according to Equation 1, Ki+1=Ki+[αRn−βSn], in FIG. 5.

Here, α refers to detailed mode learning sensitivity and is a value that determines a degree (sensitivity) by which the guidance level is changed in response to REQUEST NOTIFICATION (Rn) which is a REQUEST command count result. In addition, β refers to simple mode learning sensitivity and is a value that determines a degree (sensitivity) by which the guidance level is changed in response to SUPPRESS NOTIFICATION (Sn) which is a SUPPRESS command count result.

Accordingly, the guidance level increases in response to Rn as α increases and decreases in response to Sn as β increases. α and β may be predetermined according to user requirements (determined by manual input of the user) or determined according to determination of the learning logic (user requirements as determined by comparing Sn with Rn).

In addition, the learning logic may adaptively determine α and β such that appropriate level change can be made according to the number of levels (10 levels in FIG. 5) between the simple guidance mode and the detailed guidance mode and the values of Sn and Rn (e.g. whether the values are less than 10 or more than 50).

FIG. 6 illustrates a method of changing the current guidance level Ki to the new guidance level Ki+1 according to Sn and Rn accumulated for a first interval.

While the first interval may be identical to the guidance level change interval, the present disclosure is not limited thereto. It is assumed that α and β are 1.

In a first case CASE1, when Rn and Sn accumulated for the first interval are Rn=3 and Sn=1, the new guidance level Ki+1 can be determined to increase from the current guidance level Ki by 2 levels according to Equation 1. When the current guidance level Ki is 5, as shown in FIG. 5, the new guidance level Ki+1 is determined to be 7.

That is, in the first case CASE1, when Rn is compared with Sn while α and β are identical, Rn is larger than Sn and thus it can be determined that the user desires a guidance level higher than the current guidance level Ki (guidance sound needs to be generated more frequently).

In a second case (CASE2), when Rn and Sn accumulated for the first interval are Rn=1 and Sn=3, the new guidance level Ki+1 can be determined to decrease from the current guidance level Ki by 2 levels according to Equation 1. When the current guidance level Ki is 5, as shown in FIG. 5, the new guidance level Ki+1 is determined as 3.

That is, in the second case CASE2, when Rn is compared with Sn while α and β are identical, Sn is larger than Rn and thus it can be determined that the user desires a guidance level lower than the current guidance level Ki (guidance sound needs to be generated less frequently).

If α is greater than β, the current guidance level Ki can be increased even if Rn and Sn are identical. When α is less than β, the current guidance level Ki can be decreased even if Rn and Sn are identical.

When the result [αRn−βSn] of Equation 1 is 0, the current guidance level Ki is maintained. When [αRn−βSn] is a decimal, the current guidance level Ki can be changed by making the decimal an integer (e.g. rounding off the decimal). In addition, when the current guidance level Ki is 1 or 10, and thus, the level cannot be further decreased or increased, the current guidance level Ki can be maintained.

The route guidance control logic included in the controller 140 can execute voice route guidance at an interval according to the new guidance level Ki+1 determined by the learning logic (S50).

Therefore, according to the route guidance method, navigation terminal and vehicle including the same of the present disclosure, when the user misses voice route guidance of navigation while driving the vehicle and thus the user re-requests voice route guidance, the corresponding voice route guidance can be immediately executed so as to aid in safe driving.

In addition, when voice guidance of navigation is unnecessarily repeated, disturbing conversation, music listening, and the like and thus the user requests suspension of voice guidance, the corresponding voice route guidance is immediately suspended to promote user convenience.

Furthermore, the user can select an appropriate guidance level according to propensity of the user since a plurality of guidance levels for the frequency of voice route guidance is provided, improving user experience.

Moreover, it is possible to enhance user satisfaction for voice guidance by automatically selecting a guidance level on the basis of the numbers of re-requests and suspension requests of the user without user intervention.

The aforementioned route guidance method, navigation terminal and vehicle including the same may be implemented as computer-readable code stored in a computer-readable recording medium. The computer-readable recording medium includes all kinds of recording media storing data readable by a computer system. Examples of the computer-readable recording medium include a ROM, a RAM, a magnetic tape, a magnetic disk, a flash memory, an optical data storage device, and the like. In addition, the computer-readable recording medium may be distributed to computer systems connected through a computer communication network, stored and executed as code readable in a distributed manner.

Although exemplary aspects of the present inventive concept have been described for illustrative purposes, those skilled in the art will appreciate that various modifications, additions and substitutions are possible, without departing from essential characteristics of the invention. Thus, embodiments disclosed herein are only exemplary and not to be considered as a limitation of the invention. Accordingly, the scope of the invention is not to be limited by the above aspects but by the claims and the equivalents thereof.

What is claimed is:

1. A route guidance method for executing voice route guidance for a route to a destination, the method comprising:
    executing, by a controller, a voice route guidance for an intersection in the route at first intervals of distance and according to a current guidance level;
    stopping, by the controller, the voice route guidance currently being executed when a suppress command is input, the voice route guidance being stopped until passing the intersection;
    re-executing, by the controller, the voice route guidance currently being suspended when a request command is input;
    counting, by the controller, a number of input of the suppress command and a number of input of the request command received during the execution of the voice route guidance;

updating, by the controller, the current guidance level to a new guidance level using count results for the suppress command and the request command; and executing, by the controller, the voice route guidance at second intervals of distance and according to the new guidance level, wherein re-executing the voice route guidance currently being suspended includes:

upon inputting the request command, calculating a distance from a current location to the intersection, and executing the voice route guidance based on the calculated distance, and updating to the new guidance level includes:

setting the new guidance level to a lower level than the current guidance level when the count result of the suppress command increases, and setting the new guidance level to a higher level than the current guidance level when the count result of the request command increases, and each of the first and second intervals of distance varies according to the distance from the current location to the intersection.

2. The route guidance method of claim 1, wherein the current guidance level is one of a plurality of levels from a simple guidance mode to a detailed guidance level.

3. The route guidance method of claim 1, wherein a variation of the new guidance level for the count result of the suppress command is determined by a predetermined simple mode learning sensitivity.

4. The route guidance method of claim 1, wherein a variation of the new guidance level for the count result of the request command is determined by a predetermined detailed mode learning sensitivity.

5. A navigation terminal for executing voice route guidance for a route to a destination, the navigation terminal comprising:

a route guidance control logic for executing a voice route guidance for an intersection in the route at intervals of distance according to a current guidance level, stopping the voice route guidance currently being executed when a suppress command is input, the voice route guidance being stopped until passing the intersection, and re-executing the voice route guidance currently being suspended when a request command is input; and a learning logic for counting a number of input of the suppress command and a number of input of the request command received during the execution of the voice route guidance and updating the current guidance level to a new guidance level using count results for the suppress command and the request command, wherein the route guidance control logic and the learning logic are implemented in a controller for performing the voice route guidance, wherein, upon input of the request command, the route guidance control logic calculates a remaining distance from a current location to the intersection and executes the voice route guidance based on the calculated distance, wherein the learning logic sets the new guidance level to a lower level than the current guidance level when the count of the suppress command increases, and sets the new guidance level to a higher level than the current guidance level when the count of the request command increases, and wherein the intervals of distance vary according to the distance from the current location to the intersection.

6. The navigation terminal of claim 5, wherein the current guidance level is one of a plurality of levels corresponding to a simple guidance mode to a detailed guidance mode.

7. The navigation terminal of claim 5, wherein a variation of the new guidance level for the count result of the suppress command is determined by a predetermined simple mode learning sensitivity.

8. The navigation terminal of claim 5, wherein a variation of the new guidance level for the count result of the request command is determined by a predetermined detailed mode learning sensitivity.

* * * * *